United States Patent [19]

Hand

[11] Patent Number: 5,312,037
[45] Date of Patent: May 17, 1994

[54] HEATER FOR A GOLF CART OR THE LIKE

[76] Inventor: John C. Hand, R.R. Box 2022, Columbus, Tex. 78934

[21] Appl. No.: 78,812

[22] Filed: Jun. 21, 1993

[51] Int. Cl.$^5$ ................................................ B60H 1/02
[52] U.S. Cl. .................................. 237/12.3 C; 248/313
[58] Field of Search ...................... 237/12.3 A, 12.3 B, 237/12.3 C, 12.3 R; 248/313, 310, 311.2, 312, 316.1, 316.2, 316.5

[56] References Cited

U.S. PATENT DOCUMENTS

| D. 245,929 | 9/1977 | Montambo | D29/5 |
| D. 319,539 | 9/1991 | Brown et al. | D3/40 |
| 4,213,592 | 7/1980 | Lingenfelser | 248/313 |
| 4,899,931 | 2/1919 | Isley | 237/12.3 C |
| 4,997,157 | 3/1991 | Sweeny | 248/313 |

Primary Examiner—Henry A. Bennet
Attorney, Agent, or Firm—Rhodes & Ascolillo

[57] ABSTRACT

A heater for heating the interior of a utility vehicle, such as a golf cart or the like, the utility vehicle having a dashboard, the heater including a portable heating source, the portable heating source including a pressurized tank of a flammable gas, at least a portion of an exterior surface of the pressurized tank being substantially cylindrical, a burner mechanism for receiving the flammable gas from the pressurized tank and for combusting the flammable gas, a heat deflector for directing heat released by the combusted gas, and a pressure regulating mechanism for supplying a regulated flow of the pressurized gas to the burner mechanism, and a heater bracket for securing the portable heating source to the dashboard of the utility vehicle, the heater bracket including a back plate, a pair of lateral side plates, one each of the lateral side plates extending outward from a lateral side of the back plate, a bottom plate, the bottom plate extending outward from a bottom side of the back plate, a mounting flange, the mounting flange extending outward from a top side of the bottom plate, a retaining strap mechanism for retaining the portable heating source against the back plate, between the pair of lateral side plates, and on top of the bottom plate, and a releasable latch mechanism for releasably latching the retaining strap mechanism.

13 Claims, 3 Drawing Sheets

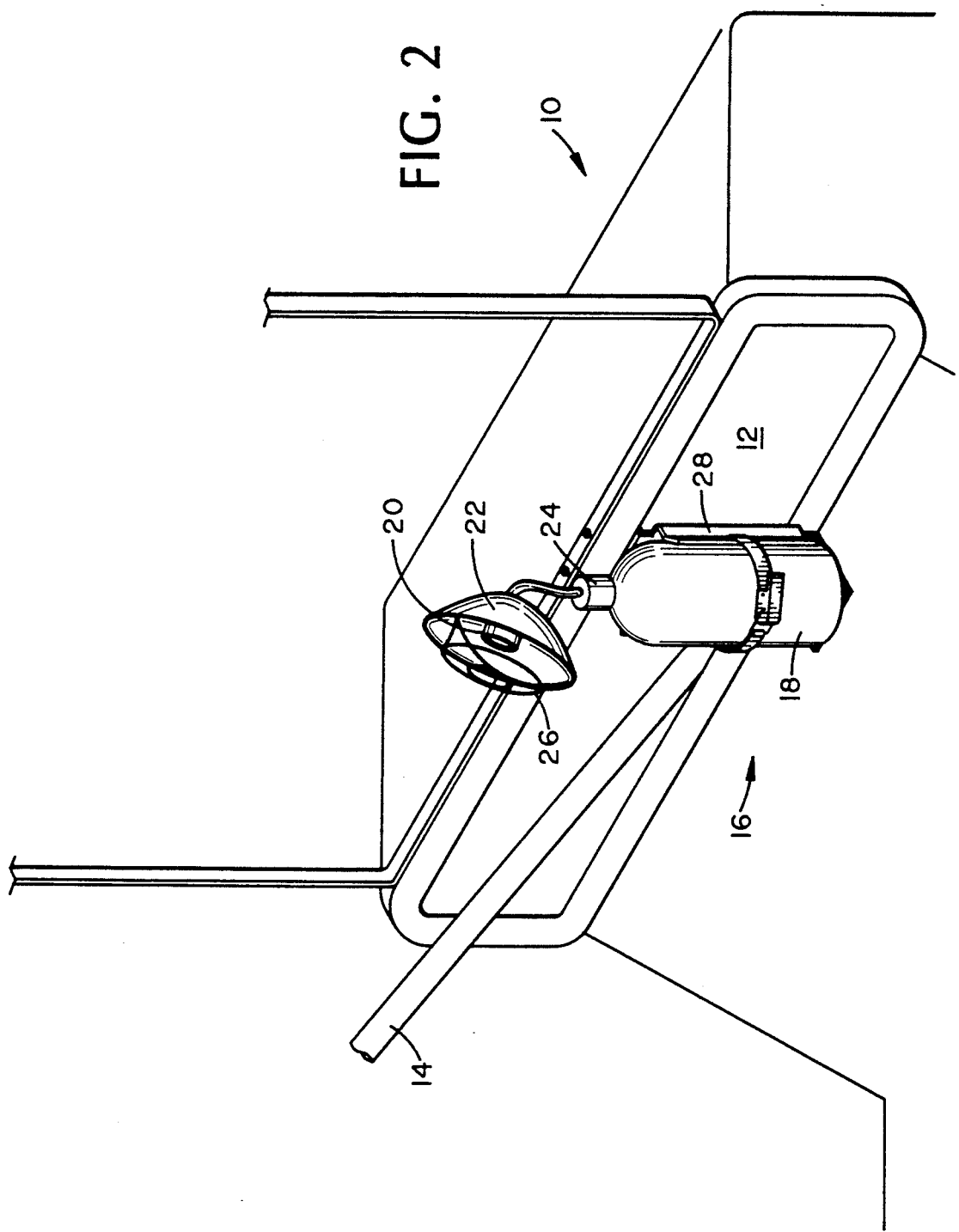

HEATER FOR A GOLF CART OR THE LIKE

BACKGROUND

1. Field of the Invention

The present invention relates to a heater for heating the interior of a small utility vehicle, for example, a golf cart. Even more particularly, the invention relates to a bracket that can accommodate commercially available portable gas fired heaters.

There are many avid golfers throughout the world that play every day and in all types of weather, and many of these players own their own golf carts. There are also those, such a maintenance personnel, who are obligated to be on the course in extreme weather conditions. The invention described and claimed herein would be a welcome addition to the golf carts (or utility vehicles) used for either of these activities.

2. Description of the Related Art

U.S. Pat. No. 4,899,931 relates to a golf cart heater having an adapter bracket that is provided with a rectangular cutout for receiving a similarly shaped gas fuel burning element and an arcuate cutout for supporting a gas fuel bottle oriented substantially on its side, the burning element and the bottle being connected to one another by a supply hose.

U.S. Pat. No. 4,213,592 discloses a bracket assembly for mounting a fire extinguisher thereon that includes a back plate having a lever equipped latch for retaining the fire extinguisher against the back plate, a lug for engaging the bottom of the extinguisher, and an elastomeric pad for ejecting the extinguisher away from the back plate upon tripping of the lever equipped latch.

U.S. Pat. No. 4,997,157 relates to a bracket assembly for mounting a fire extinguisher that includes a base unit, and a strap that passes through cutouts provided in the base unit, so that the strap is interlocked with the base unit when the base unit is secured to a wall.

Finally, U.S. Pat. No. De. 245,929 discloses a design for a fire extinguisher bracket, and U.S. Pat. No. De. 319,539 discloses a design for a holder for a vehicle fire extinguisher, flare, and maps.

SUMMARY OF THE INVENTION

In one aspect, the invention generally features a heater for heating the interior of a utility vehicle, such as a golf cart or the like, the utility vehicle having a dashboard, the heater including: a portable heating source, the portable heating source including: a pressurized tank of a flammable gas; at least a portion of an exterior surface of the pressurized tank being substantially cylindrical; a burner mechanism for receiving the flammable gas from the pressurized tank and for combusting the flammable gas; a heat deflector for directing heat released by the combusted gas; and a pressure regulating mechanism for supplying a regulated flow of the pressurized gas to the burner mechanism; and a heater bracket for securing the portable heating source to the dashboard of the utility vehicle, the heater bracket including: a back plate; a pair of lateral side plates, one each of the lateral side plates extending outward from a lateral side of the back plate; a bottom plate, the bottom plate extending outward from a bottom side of the back plate; a mounting flange, the mounting flange extending outward from a top side of the bottom plate; a retaining strap mechanism for retaining the portable heating source against the back plate, between the pair of lateral side plates, and on top of the bottom plate; and a releasable latch mechanism for releasably latching the retaining strap mechanism.

Preferably, the mounting flange extends outward from the back plate in a direction substantially opposite to the bottom plate; each of the pair of lateral side plates includes a first planar flange portion and a second planar flange portion, the first planar flange portion extending outward from the lateral side of the back plate, the second planar flange portion extending outward from the first planar flange portion, and the first and second planar flange portions being disposed at an oblique angle with respect to one another; each of the first planar flange portions extends outward at a substantially right angle from the respective lateral side of the back plate; the mounting plate extends outward at substantially a right angle from the top side of the back plate; the bottom plate extends outward at substantially a right angle from the bottom side of the back plate; and the retaining strap mechanism includes a pair of strap members, one each of the strap members being attached to approximately the midpoint of one each of the second planar flange portions, and the releasable latch mechanism includes a releasable latching mechanism interconnecting the pair of strap members.

In another aspect, the invention generally features a heater bracket for securing a portable heating source to the interior of a vehicle, the heater bracket including: a back plate; a pair of lateral side plates, one each of the pair of lateral side plates extending outward from a lateral side of the back plate; a bottom plate, the bottom plate extending outward from a bottom side of the back plate; a mounting flange, the mounting flange extending outward from a top side of the bottom plate; a retaining strap mechanism for retaining the portable heating source against the back plate, between the pair of lateral side plates, and on top of the bottom plate; and a releasable latch mechanism for releasably latching the retaining strap mechanism.

Preferably, the mounting flange extends outward from the back plate in a direction substantially opposite to the bottom plate; each of the pair of lateral side plates includes a first planar flange portion and a second planar flange portion, the first planar flange portion extending outward from the lateral side of the back plate, the second planar flange portion extending outward from the first planar flange portion, and the first and second planar flange portions being disposed at an oblique angle with respect to one another; each of the first planar flange portions extends outward at a substantially right angle from the respective lateral side of the back plate; the mounting plate extends outward at substantially a right angle from the top side of the back plate; the bottom plate extends outward at substantially a right angle from the bottom side of the back plate; and the retaining strap mechanism includes a pair of strap members, one each of the strap members being attached to approximately the midpoint of one each of the second planar flange portions, and the releasable latch mechanism includes a releasable latching mechanism interconnecting the pair of strap members.

In yet another aspect, the invention generally features a heater bracket for securing a portable heating source to the interior of a vehicle, the heater bracket including: a back plate; a pair of lateral side plates, one each of the lateral side plates extending outward from a lateral side of the back plate; a bottom plate, the bottom plate extending outward from a bottom side of the back plate; a mounting flange, the mounting flange extending outward from a top side of the bottom plate; a retaining strap mechanism for retaining the portable heating source against the back plate, between the pair of lateral side plates, and on top of the bottom plate; and a releasable latch mechanism for releasably latching the retaining strap mechanism; wherein the mounting flange extends outward from the back plate in a direction substantially opposite to the bottom plate; wherein the mounting flange extends outward from the back plate in a direction substantially opposite to the bottom plate; wherein each of the pair of lateral side plates includes a first planar flange portion and a second planar flange portion, the first planar flange portion extending outward from the lateral side of the back plate, the second planar flange portion extending outward from the first planar flange portion, and the first and second planar flange portions being disposed at an oblique angle with respect to one another; wherein each of the first planar flange portions extends outward at a substantially right angle from the respective lateral side of the back plate; wherein the mounting plate extends outward at substantially a right angle from the top side of the back plate; wherein the bottom plate extends outward at substantially a right angle from the bottom side of the back plate; and wherein the retaining strap mechanism includes a pair of strap members, one each of the strap members being attached to approximately the midpoint of one each of the second planar flange portions, and the releasable latch mechanism includes a releasable latching mechanism interconnecting the pair of strap members.

One object of the present invention is the provision of a heater for heating the interior of a utility vehicle, such as a golf cart.

Another object of the invention is the provision of a heater bracket that will securely mount a portable heating unit to the dashboard of such a utility vehicle.

Another object of the invention is the provision of such a heater bracket that is simply constructed and that can be inexpensively manufactured.

The invention will now be described by way of a particularly preferred embodiment, reference being made to the accompanying drawings, wherein:

BRIEF DESCRIPTION OF THE DRAWINGS

FIG. 2 is an elevational view of a utility vehicle equipped with the utility vehicle heater of FIG. 1;

DESCRIPTION OF THE PREFERRED EMBODIMENT

Figure 1:
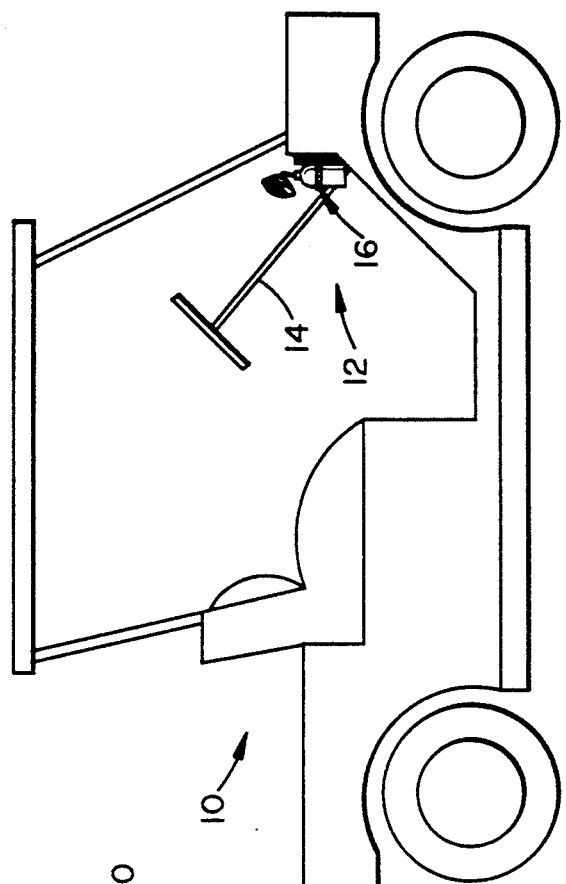
FIG. 1 is a perspective view of a heater for a utility vehicle constructed according to the present invention.

Referring initially most particularly to FIGS. 1 and 2, a utility vehicle 10, e.g., a golf cart, is conventionally provided with a dashboard area 12, adjacent a steering column 14 thereof. A utility vehicle heater 16 which, according to the present invention, is designed for convenient attachment to the dashboard 12 of the utility vehicle 10 generally includes a pressurized tank 18 of a flammable gas, for example, propane, the tank 18 having a generally cylindrical exterior surface, a burner element 20 for receiving and combusting the gas, a heat deflector 22 for directing the heat produced in a particular direction, and a regulator 24 for supplying an even and steady flow of the gas to the burner element 20. Preferably, the utility vehicle heater 16 is additionally provided with a shield, for example a wire cage 26 for safety reasons. Additionally, the utility vehicle heater 16 further includes a heater bracket 28 for securely mounting the utility vehicle heater 16 to the dashboard 12.

Figure 3:
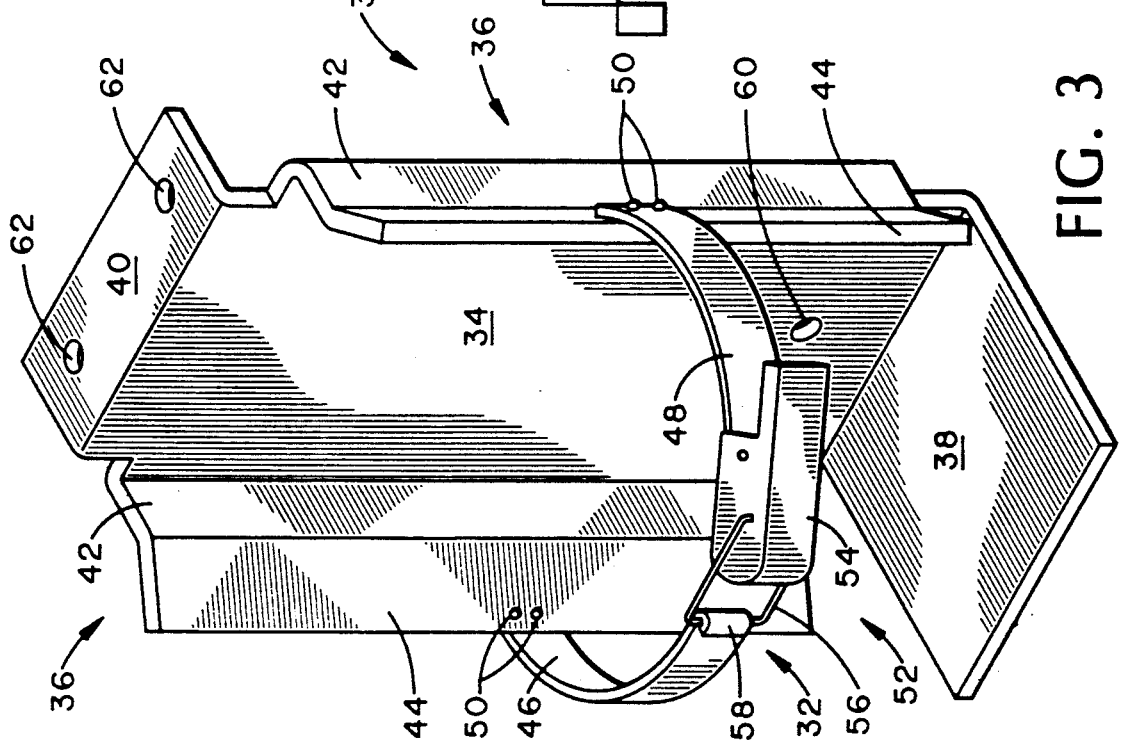
FIG. 3 is a perspective view of a dashboard of the utility vehicle equipped with the inventive heater.
Figure 4:
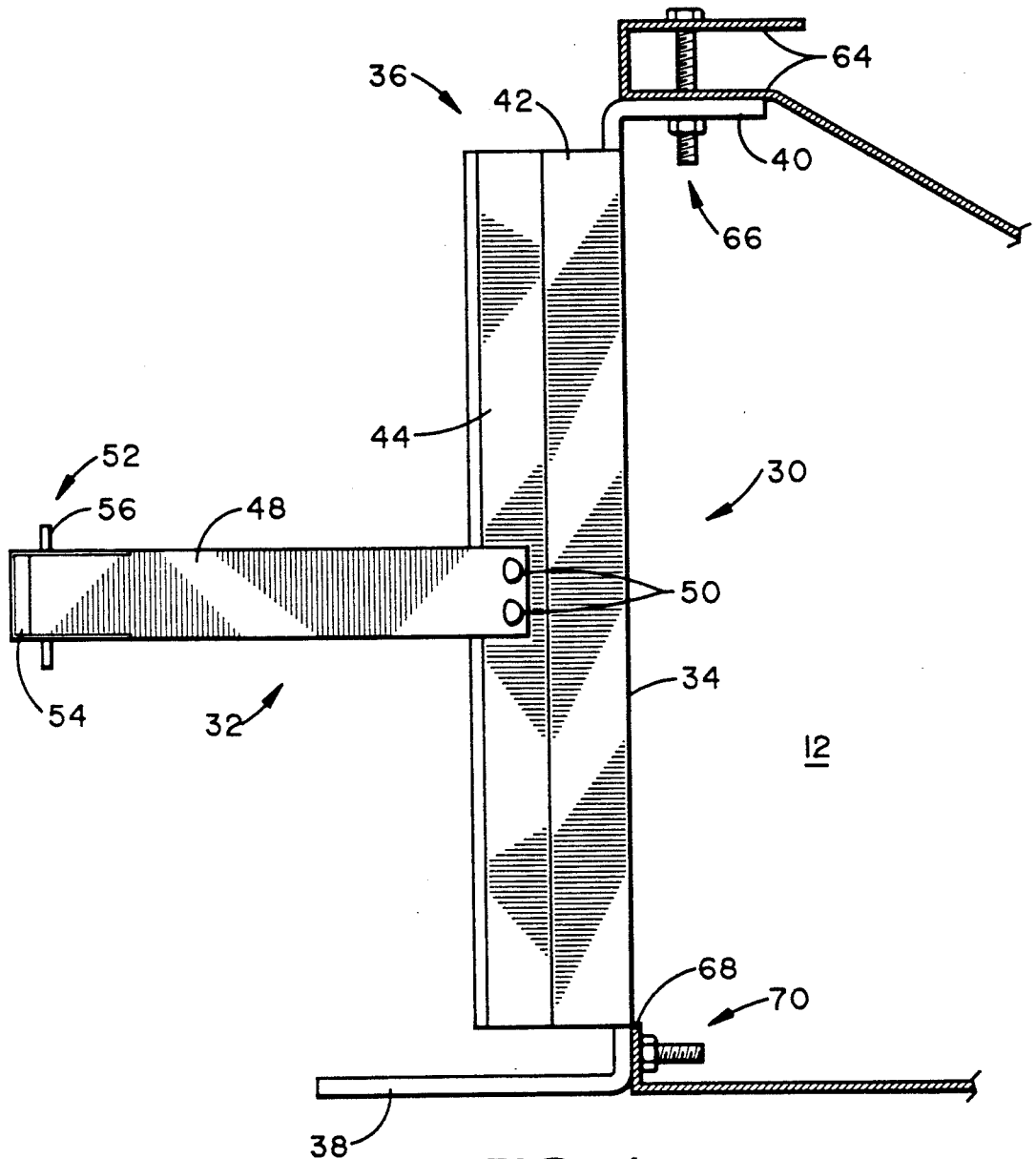
FIG. 4 is a side elevational view of the inventive heater.

The heater bracket 28, shown with more particularity in FIGS. 3 and 4, generally includes a bracket portion 30 and a retaining strap portion 32. Preferably, the bracket portion 30 is integrally constructed by the stamping or forming of a flat metal material, for example, steel.

The bracket portion 30 according to the present invention generally includes a back plate 34, a pair of lateral side plates 36 that extend obliquely outward from the lateral sides of the back plate 34, a bottom plate 38 extending outward from the bottom edge of the back plate 34, and a top mounting flange 40 that extends outward from the top side of the back plate 34 in a direction opposite to the direction of extension of the bottom plate 38.

Each of the lateral side plates 36 includes a first planar flange portion 42 and a second planar flange portion 44, the first planar flange portions 42 extending forward at substantially right angles from the back plate 34, and the second planar flange portions 44 extending obliquely forward and outward from the first planar flange portions 42.

The retaining strap portion 32 generally includes a first strap member 46 and a second strap member 48, each of the first and second strap members 46 and 48 being secured to the approximate lateral midpoints of the respective second planar flange portions 44 by a pair of rivets 50. Preferably, the first and second strap members 46 and 48 are each formed from a resilient and elastic material, for example, a springy sheet steel or a plastic. The retaining strap portion 32 additionally includes a releasable latching mechanism in the form of a clasp 52 that includes a lever member 54 pivotally attached to the distal end of the second strap member 48, a loop member 56 connected to the lever member 54, and a semicircular hook 58 provided on the distal end of the first strap member 46.

For attachment to the dashboard to the dashboard area 12 of the utility vehicle 10, the back plate 34 is provided with preferably one throughgoing hole 60, and the top mounting flange 40 is provided with preferably two throughgoing holes 62, seen most clearly in FIG. 3. The use of the mounting holes 60 and 62 is shown most clearly in FIG. 4, where it is seen that the heater bracket 28 is secured to an upper substantially horizontal member 64 of the dashboard 12 via the two mounting holes 62 and a pair of bolts and associated nuts 66, and to a lower substantially vertical member 68 of the dashboard 12 via the single mounting hole 60 and an associated bolt and nut 70.

With the heater bracket 28 so mounted to the dashboard 12, the heater unit, which includes the pressurized tank 18, the burner element 20, the heat deflector 22, the regulator 24, and preferably the wire cage 26, can be positioned between the lateral side plates 36, supported by the bottom plate 38, and securely retained by the retaining strap portion 32. Preferably, the heater unit employed is a commercially available portable gas fired heater unit, similar to those used for camping.

While the invention has been herein described by way of a particular preferred embodiment, various substitutions of equivalents may be effected without departing from the spirit and scope of the invention as set forth in the following claims.

What is claimed is:

1. A heater for heating the interior of a utility vehicle, the utility vehicle having a dashboard, said heater comprising:
    a portable heating source, said portable heating source comprising:
    a pressurized tank of a flammable gas;
    at least a portion of an exterior surface of said pressurized tank being substantially cylindrical;
    burner means for receiving said flammable gas from said pressurized tank and for combusting said flammable gas;
    a heat deflector for directing heat released by said combusted gas; and
    pressure regulating means for supplying a regulated flow of said pressurized gas to said burner means; and
    a heater bracket for securing said portable heating source to the dashboard of the utility vehicle, said heater bracket comprising:
    a back plate;
    a pair of lateral side plates, one each of said lateral side plates extending outward from a lateral side of said back plate;
    a bottom plate, said bottom plate extending outward from a bottom side of said back plate;
    a mounting flange, said mounting flange extending outward from a top side of said bottom plate;
    retaining strap means for retaining the portable heating source against said back plate, between said pair of lateral side plates, and on top of said bottom plate; and
    releasable latch means for releasably latching said retaining strap means.

2. A heater according to claim 1, wherein said mounting flange extends outward from said back plate in a direction substantially opposite to said bottom plate.

3. A heater according to claim 2, wherein each of said pair of lateral side plates comprises a first planar flange portion and a second planar flange portion, said first planar flange portions extending outward from said lateral sides of said back plate, said second planar flange portions extending outward from said first planar flange portions, and said first and second planar flange portions being disposed at an oblique angle with respect to one another.

4. A heater according to claim 3, wherein each of said first planar flange portions extends outward at a substantially right angle from said respective lateral side of said back plate.

5. A heater according to claim 4, wherein said mounting plate extends outward at substantially a right angle from said top side of said back plate.

6. A heater according to claim 5, wherein said bottom plate extends outward at substantially a right angle from said bottom side of said back plate.

7. A heater according to claim 6, wherein said retaining strap means comprises a pair of strap members, one each of said strap members being attached to approximately the midpoint of one each of said second planar flange portions, and wherein said releasable latch means comprises a releasable latching mechanism interconnecting said pair of strap members.

8. A heater bracket for securing a portable heating source to the interior of a vehicle, said heater bracket comprising:
    a back plate;
    a pair of lateral side plates, one each of said pair of lateral side plates extending outward from a lateral side of said back plate, wherein each of said pair of lateral side plates comprises a first planar flange portion and a second planar flange portion, said first planar flange portion extending outward from said lateral side of said back plate, said second planar flange portion extending outward from said first planar flange portion, and said first and second planar flange portions being disposed at an oblique angle with respect to one another;
    a bottom plate, said bottom plate extending outward from a bottom side of said back plate;
    a mounting flange, said mounting flange extending outward from a top side of said bottom plate, and said mounting flange extending outward from said back plate in a direction substantially opposite to said bottom plate;
    retaining strap means for retaining the portable heating source against said back plate, between said pair of lateral side plates, and on top of said bottom plate; and
    releasable latch means for releasably latching said retaining strap means.

9. A heater bracket according to claim 8, wherein each of said first planar flange portions extends outward at a substantially right angle from said respective lateral side of said back plate.

10. A heater bracket according to claim 9, wherein said mounting plate extends outward at substantially a right angle from said top side of said back plate.

11. A heater bracket according to claim 10, wherein said bottom plate extends outward at substantially a right angle from said bottom side of said back plate.

12. A heater bracket according to claim 11, wherein said retaining strap means comprises a pair of strap members, one each of said strap members being attached to approximately the midpoint of one each of said second planar flange portions, and wherein said releasable latch means comprises a releasable latching mechanism interconnecting said pair of strap members.

13. A heater bracket for securing a portable heating source to the interior of a vehicle, said heater bracket comprising:
    a back plate;
    a pair of lateral side plates, one each of said lateral side plates extending outward from a lateral side of said back plate;
    a bottom plate, said bottom plate extending outward from a bottom side of said back plate;
    a mounting flange, said mounting flange extending outward from a top side of said bottom plate;
    retaining strap means for retaining the portable heating source against said back plate, between said pair of lateral side plates, and on top of said bottom plate; and
    releasable latch means for releasably latching said retaining strap means;
    wherein said mounting flange extends outward from said back plate in a direction substantially opposite to said bottom plate;
    wherein each of said pair of lateral side plates comprises a first planar flange portion and a second planar flange portion, said first planar flange portions extending outward from said lateral sides of said back plate, said second planar flange portions extending outward from said first planar flange portions, and said first and second planar flange portions being disposed at an oblique angle with respect to one another;

wherein each of said first planar flange portions extends outward at a substantially right angle from said respective lateral side of said back plate;

wherein said mounting plate extends outward at substantially a right angle from said top side of said back plate;

wherein said bottom plate extends outward at substantially a right angle from said bottom side of said back plate; and wherein said retaining strap means comprises a pair of strap members, one each of said strap members being attached to approximately the midpoint of one each of said second planar flange portions; and wherein said releasable latch means comprises a releasable latching mechanism interconnecting said pair of strap members.

* * * * *